March 9, 1971     R. H. WALKER     3,568,251

APPARATUS FOR MANUFACTURING TUMBLING MEDIA

Filed Jan. 29, 1968

INVENTOR.
ROBERT H. WALKER
BY *Walter Fred*
AGENT

United States Patent Office 3,568,251
Patented Mar. 9, 1971

3,568,251
APPARATUS FOR MANUFACTURING
TUMBLING MEDIA
Robert H. Walker, Worcester, Mass., assignor to
Norton Company, Worcester, Mass.
Filed Jan. 29, 1968, Ser. No. 701,310
Int. Cl. B29d 31/00
U.S. Cl. 18—12                               8 Claims

ABSTRACT OF THE DISCLOSURE

Extruding a plastic abrasive mix through a multi-hole die adapted to combine emerging strands of the mix into a single strand whereby the strands move at the same linear rate. The single strand is cut into large pellets of uniform length, after which they are divided into smaller pellets corresponding to the original number, size, and shape of each of the combined strands and cured.

BACKGROUND OF THE INVENTION (1) The invention relates to producing tumbling media of uniform shape and size used as an abradant for finishing the surfaces of workpieces tumbled therewith in tumbling or vibratory devices.

(2) Heretofore, it has been difficult to extrude a plurality of strands, cut the emerging strands together and consistently produce pellets of uniform length. Various factors, such as number of strands, size, shape, coefficient of friction of the extrudant, type of material, and distance it travels through the die, as well as pulsations in the extruding device, contribute to produce fluctuations in the linear feed rate of the extruded strands.

The prior art has attempted to solve the problem by simultaneously extruding thin connecting webs between the multiple extrusions such as is disclosed in U.S. Pat. 2,464,746. However, pellets produced with connecting webs are not wholly satisfactory without further processing for tumbling media because portions of the web remain attached upon separating the pellets.

Today, tumbling media is produced in various uniform shapes and sizes to produce various controlled effects on the workpiece. Therefore, variation in shape or size or any remaining portion, such as that of a connecting web, would produce undesirable effects in the surface finish of the workpiece tumbled therewith.

The instant invention overcomes the above mentioned difficulties by producing consistent controlled uniform shapes and sizes of pellets which can be depended upon to produce a uniform desired effect or finish upon the surface of the workpieces tumbled or vibrated therewith.

SUMMARY OF THE INVENTION

Briefly, the invention comprises an extruding apparatus equipped with a die having a plurality of converging holes of uniform shape for producing multiple strands of an abrasive mix. The multiple strands are combined into a single strand or rope on passing through a compaction ring or chamber having a tapered hole the shape of which corresponds substantially to the outline around the perimeter of the combined strands. Each of the strands are brought into light frictional supporting contact with one another and conveyed as a single strand cut into large pellets of uniform length. The large pellets are collected, partially dried and agitated or vibrated to divide them, along the original lines of contact between the compacted strands, into smaller pellets of uniform size and cross-sectional shape of the strands. Finally, they are cured into a rigid structure for use.

Therefore, it is the primary object of the invention to provide apparatus for consistently producing tumbling media of uniform size and shape.

Another object is to provide a method and apparatus of extruding and combining multiple strands of the extrudant into a single strand without connecting webs.

Another object is to provide apparatus of combining multiple strands of extrudant into a single strand, cutting the strand into large pellets of uniform lengths and dividing the large pellets into smaller pellets which correspond to the original number and shape of the strands of extrudant.

A still further object is to provide apparatus of combining multiple strands, emerging from an extrusion die at different speeds, into a single dividable strand whereby the strands advance together at the same rate of speed.

DESCRIPTION OF THE PREFERRED EMBODIMENTS

Figure 1:
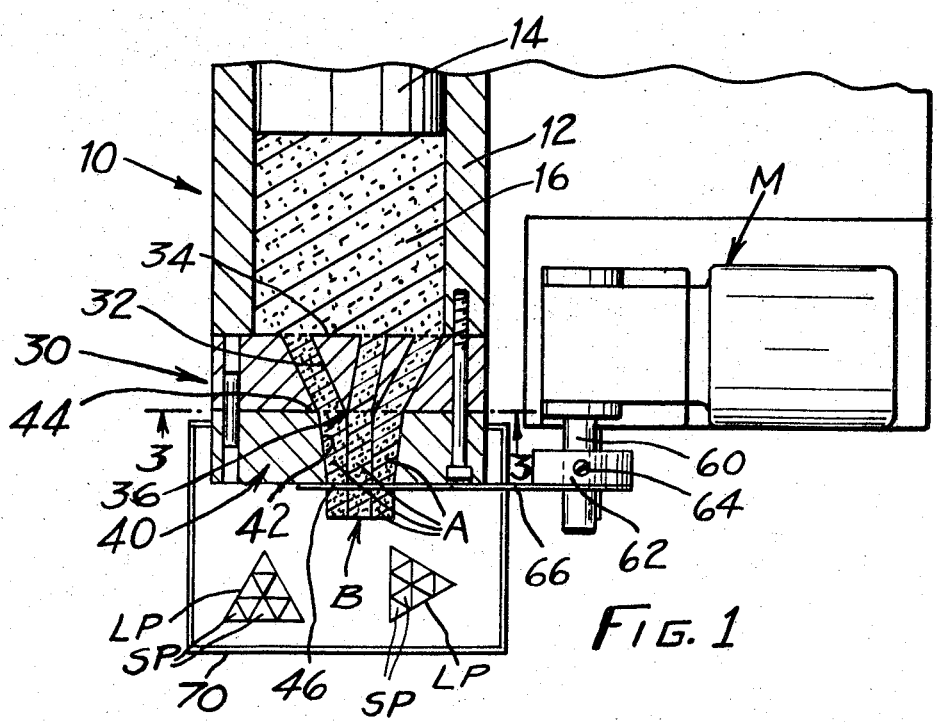
FIG. 1 is a fragmentary plan view partly in section of the extruding apparatus of the invention taken along line 1—1 of FIG. 2.
Figure 2:
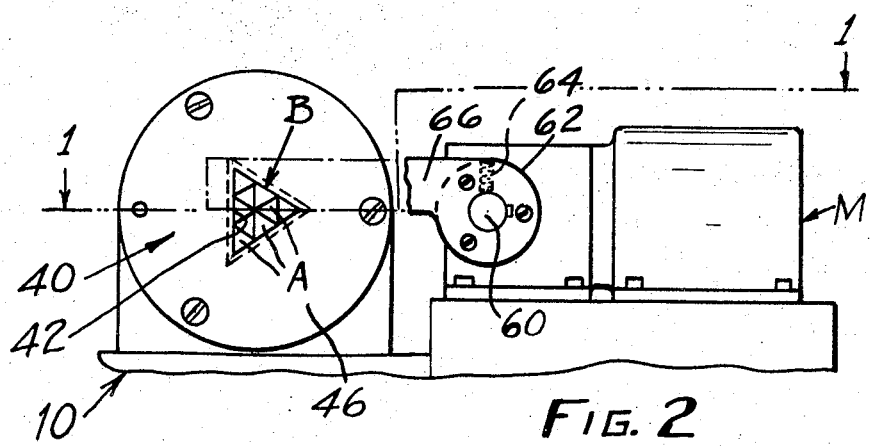
FIG. 2 is an end view of the apparatus of FIG. 1 showing the multiple strands, compacted together.

Referring to the drawings, there is shown an apparatus 10 for carrying out the method of producing tumbling media or pellets SP of uniform triangular shape cut into uniform predetermined lengths. However, it is obvious that other geometric shapes, and lengths may be produced by modifying the apparatus merely by replacing the dies and/or readjusting other components thereof.

Referring to the drawings, there is shown a portion of extruding apparatus 10 which may be one of many commercially available types. The apparatus 10 comprises an extruding chamber or cylinder 12, wherein is mounted movable means, such as a piston 14 for forcing a plastic mix 16 through a multi-hole extrusion die 30 fixed to the end of the chamber 12. It is deemed unnecessary to show the feed hopper and mechanism which feed the mix into the chamber 12 as they may be of various conventional types well known in the art. The die 30 has a plurality of holes 32 which in this embodiment are of uniform triangular shape and size converging toward one another from the inlet side 34 to the outlet side 36, of the die 30.

It can be seen that the holes 32 are of different length and therefore present various degrees of resistance and feed rate to the material or mix passing through. If, therefore, the strands were cut as they emerge from the exit end 36, undesirable pellets of different lengths would be produced. In order to overcome this fault of multi-hole dies, a compaction ring 40 is fixed adjacent to the exit end 36 of the die 30. The compaction ring 40 has a central hole 42 which is, in this embodiment, of triangular shape with tapering side wall surfaces converging from a large entrance end 44 toward a smaller exit end 46. The triangular entrance hole 44 corresponding in shape and size to an outline or perimeter around the extremities of the holes 32 and within which is encompassed the entire number of the slightly spaced converging holes 32 at the outlet end 36 of the die 30. As shown, it is obvious that walls within the hole 42 taper sufficiently toward the smaller exit end 46 and will guide, force and converge the emerging multiple triangular strands A together into light frictional supporting contact with one another whereby they are combined into a single strand B. Therefore, the shape and size of the exit end 46 can be predetermined to correspond in shape and size to the outline or perimeter around the number of strands of the desired shape which it encompasses when compacted together into supporting engagement with one another.

Upon combining the multiple strands A together into a single strand B, they advance together at the same rate.

It is obvious that the die 30 and the compaction ring 40 could be combined into a single piece by merely extending the die 30 and including the tapered hole 42 therein. Also, interchangeable dies and compaction rings with holes of other geometric shapes can be made to produce strands of corresponding shape. Preferably polygonal shapes are well suited since they have interfitting straight sides, surfaces which make good frictional contact with one another and are easily compacted into supporting engagement without deformation.

Figure 3:
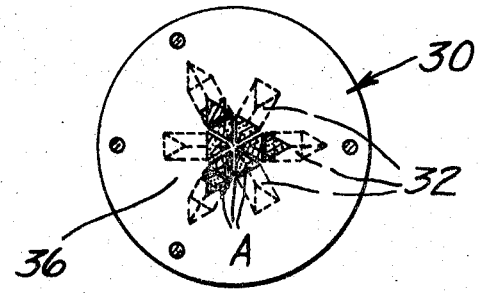
FIG. 3 is an end view of the multi-hole extrusion die taken along line 3—3 of FIG. 1.

It can be seen in FIG. 3 that the holes 32 are spaced farther apart at the inlet side 34 and converge from a larger triangular pattern or outline to a smaller triangular outline at the outlet 36 where there is very little space between them.

The entrance 44 of the hole 42 is of triangular shape aligned with and corresponding in size to the outline around and which encompasses the holes 32 at outlet end 36. Hole or compaction chamber 42 then tapers with its sidewalls converging to a still smaller triangle at exit end 46 which corresponds to the outline which encompasses the compacted strands A in light frictional supporting contact with one another.

Means for cutting the strand B into large pellets LP of uniform length comprises a commercially available, conventional, variable, but constant speed reduction type motor M fixedly mounted in an adjusted position on the apparatus 10 adjacent the cylinder 12.

The motor M has a rotatable output shaft 60 to which is keyed a hub 62 fixed in axial position by a set screw 64. A relatively thin but rigid cutting blade 66 is fixed to and rotatable with the hub 64. The blade 66 is adjusted upon rotation to wipe the exit end 46 of the compaction ring 40 and thereby cut strand B into large pellets of uniform length which fall into a container 70 below. Obviously, pellets of other uniform length may be produced by changing the relative constant speeds between the extruding apparatus and the motor M. For example, the motor M can be controlled by a rheostat or other conventional device to rotate the blade one revolution for every linear inch of the strand B extruded to produce pellets LP one inch long and either two revolutions per inch of feed or one-half the extrusion rate per revolution to produce pellets one-half inch long.

It is possible to modify the apparatus so that the strand B can be cut at an angle less than 90° to its longitudinal line of travel to produce pellets of corresponding shape. This can be done by machining the required angle on the exit end of the compaction ring and mounting the motor M so that the blade travels in a corresponding plane across the angled end face of the compaction ring.

Likewise, the cutting apparatus could be positioned, to make either a vertical or angular cut, at any distance from the end of the extruder and the strand B conveyed thereto at a linear rate in a manner disclosed in the above mentioned patent. Alternatively, the strand B may be conveyed with conventional apparatus which is synchronously driven in timed relation with the cutting apparatus and the speed of which is constantly regulated by means responsive to variations in the linear extrusion rate of strand B.

Although the preferred embodiment discloses the use of a compaction member to combine the strands A, it has been found that in some instances the chamber may be eliminated depending on the number and cross sectional size and shape of the strands and the characteristics of the plastic mix. For example, four strands of the above disclosed plastic mix were extruded with a die having a corresponding number of properly arranged converging holes of triangular shape disclosed. As the strands emerge, a side of one strand is automatically directed into frictional supporting engagement with a side of the other strands and thereby adhered to one another and combined into a single strand.

The die itself will place the strands in light frictional supporting contact whereas the compaction ring controls and maintains a predetermined uniform degree of frictional supporting contact.

An example of operating and carrying out the method of producing tumbling pellets of uniform size, shape and length will now be described.

A plastic mix consisting of the following percentages of ingredients by weight was prepared.

| | Percent |
|---|---|
| 90 to 240 grit aluminum oxide abrasive | 51 |
| Clay ceramic bonding material | 37 |
| Plasticizer and temporary binder | 1.5 |
| Petroleum grease | 1.5 |
| Water | 9 |

The plastic abrasive mix was fed into the extruding apparatus which was adjusted to extrude the mix at a constant rate of one inch per second. Likewise, the motor M was adjusted to rotate the cutting blade 4 revolutions per second and thus produce four large pellets per second, each one-quarter of an inch long.

An extrusion die with nine holes of uniform triangular shape converged nine individual strands moving through at different rates into an aligned compaction chamber 42 where the triangular strands were brought into frictional supporting contact with one another and emerged together at the same rate in a single strand B cut at constant intervals into uniform length. Upon being cut and collected in the container 70, the large pellets were conveyed to a conventional dryer where they were dried and vibrated together at a temperature of 225° F. for 20 minutes, whereby each of the large pellets divided into nine uniform pellets. The nine pellets separated or parted from one another along the original parallel lines of contact made between the compacted strands A and were of uniform length, size and shape corresponding to the original compacted strands. Thereafter, the small pellets were cured into a rigid structure in a kiln at a temperature of 1175° C. for 3 hours.

Various methods of dividing the large pellets LP into smaller pellets SP may be employed. In addition to dividing them by hand which is not economical, they may be simultaneously dried and agitated in a conventional rotary kiln or dryer, a vibrating hearth kiln, or a fluidized bed type kiln. Alternatively, the large pellets may be first dried in a stationary dry room and then vibrated or agitated on a conventional vibrating screen, bed, container, or in a tumbling barrel.

Other abrasive materials of various grit sizes may be included in the plastic mix. For example, the known metal oxides, carbides, and nitrides, emery quartz, and diamond abrasives, and mixtures of abrasive and filler materials such as cryolite and diatomaceous earth materials are suitable.

The plasticizer and temporary binder may comprise a variety of commercially available material such as wheat starch, dextrine, methyl cellulose, polyvinyl alcohol, calcium and magnesium lignosulfonates.

Various lubricants may be substituted for the petroleum grease, such as, mineral oil, vegetable or animal fats, graphite, and silicone grease.

Other bonding materials may comprise natural or synthetic, phenolic, polyester, vinyl or epoxy resin, or one of many available thermoplastic materials and mixtures thereof. Suitable ceramic bonding materials include those such as bentonite, slip, ball and kaolin clays or mixtures thereof.

More or less water may be required or other suitable liquids to provide the proper consistency to the mix.

The composition of the plastic mix may be formulated in various ways to attain the desired media which will give the desired finish on the workpieces tumbled therewith.

The prior art discloses various extrudable plastic compositions for producing tumbling pellets which are formulated by mixing together ingredients selected from the above-mentioned materials and obviously the invention herein disclosed is not limited to the mix shown by example.

However, the mix must be formulated so that it is of the proper consistency, that is, it must be a rather stiff and damp mix which, upon being extruded, remains in shape and sufficiently self-supporting without slumping in the green uncured state. It is also obvious that different formulations of the plastic mix usually require the extruded green mix to be dried and cured at different temperatures for various periods of time.

For example, organic bonded tumbling pellets may be produced in the above manner by preparing and extruding a plastic mix consisting of the following percentages of ingredient by weight.

| | Percent |
|---|---|
| 90–240 grit aluminum oxide abrasive | 78 |
| Powdered phenolic resin (5417 Bakelite) | 6 |
| Carbopol 934 (B. F. Goodrich) 2% aqueous solution (plasticizer and thickener) | 14 |
| Igepal 630 (General Aniline and Film Corp.) wetting agent and plasticizer and temporary binder | 2 |

The large pellets are dried and separated into smaller pellets and cured for 5 hours at 175° C.

It is to be understood that the disclosed embodiment of the invention is representative of one of many possible embodiments and modifications thereof, and is intended to be illustrative rather than limited thereto.

What is claimed is:

1. In combination with apparatus for manufacturing pellets having means for extruding a plastic mix and means for cutting the extruded mix into pellets of uniform length wherein the improvement comprises:
   a die fixed to the extruding means having a plurality of holes converging towards each other from an inlet side to an outlet side of the die which converges and directs continuous strands of the mix into frictional supporting engagement with one another, whereby emerging strands of the mix are combined into a single strand and move together at the same linear rate to the cutting means to be cut into large pellets of uniform length which easily divide, at each place of the frictional supporting engagement between the strands, into smaller pellets of uniform length.

2. In combination with apparatus for manufacturing tumbling pellets having means for extruding a plastic mix and means for cutting the extruded mix into pellets of uniform length, wherein the improvement comprises:
   a die fixed to the extruding means having a plurality of holes extending from an inlet side to an outlet side and from which emerge continuous strands of the mix, and
   means adjacent the outlet side, for compacting the strands into frictional supporting engagement with one another whereby the strands are combined into a single strand and move together at the same linear rate to the cutting means.

3. Apparatus according to claim 2 wherein the compacting means comprises:
   a chamber having an entrance of a size and shape which corresponds to a first outline which encompasses the plurality of the holes at the outlet side and an exit of a smaller size and shape which corresponds to a second outline which encompasses the plurality of emerging strands in frictional supporting engagement with one another.

4. Apparatus according to claim 3 wherein the chamber tapers from the entrance toward the exit.

5. Apparatus according to claim 4 wherein the plurality of holes converge toward the outlet side.

6. Apparatus according to claim 5 wherein the plurality of holes are of polygon shape.

7. Apparatus according to claim 6 wherein the converging polygon shaped holes are of substantially identical uniform shape and size.

8. Apparatus according to claim 7 wherein the tapered chamber is of polygon shape.

References Cited

UNITED STATES PATENTS

| 1,192,769 | 7/1916 | Earley | 18—12 |
| 2,401,236 | 5/1946 | Fielitz | 18—12 |
| 2,257,067 | 9/1941 | Parsons | 18—12X |
| 2,705,927 | 4/1955 | Graves et al. | 18—12X |

FOREIGN PATENTS

| 1,098,496 | 1/1968 | Great Britain. |

WILLIAM S. LAWSON, Primary Examiner